(12) United States Patent
Liu et al.

(10) Patent No.: US 9,210,269 B2
(45) Date of Patent: Dec. 8, 2015

(54) ACTIVE SPEAKER INDICATOR FOR CONFERENCE PARTICIPANTS

(71) Applicants: Yanghua Liu, San Jose, CA (US); Weidong Chen, Palo Alto, CA (US); Biren Gandhi, San Jose, CA (US); Raghurama Bhat, Cupertino, CA (US); Joseph Fouad Khouri, San Jose, CA (US); John Joseph Houston, San Jose, CA (US); Brian Thomas Toombs, San Jose, CA (US)

(72) Inventors: Yanghua Liu, San Jose, CA (US); Weidong Chen, Palo Alto, CA (US); Biren Gandhi, San Jose, CA (US); Raghurama Bhat, Cupertino, CA (US); Joseph Fouad Khouri, San Jose, CA (US); John Joseph Houston, San Jose, CA (US); Brian Thomas Toombs, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 416 days.

(21) Appl. No.: 13/664,640

(22) Filed: Oct. 31, 2012

(65) Prior Publication Data
US 2014/0118472 A1    May 1, 2014

(51) Int. Cl.
*H04M 3/42*    (2006.01)
*H04M 3/56*    (2006.01)
*H04N 7/15*    (2006.01)
*G10L 17/00*   (2013.01)

(52) U.S. Cl.
CPC ............. *H04M 3/563* (2013.01); *G10L 17/00* (2013.01); *H04N 7/15* (2013.01)

(58) Field of Classification Search
CPC .................. H04M 3/56–3/569; H04M 2203/50–2203/509; G10L 17/00
USPC ............ 348/14.01–14.16; 370/259–271, 370/351–357; 709/201–207, 217–248; 379/201.01, 202.01–207.01; 704/270–278
See application file for complete search history.

(56) References Cited

U.S. PATENT DOCUMENTS

| | | | |
|---|---|---|---|
| 5,619,555 A * | 4/1997 | Fenton et al. | 379/88.11 |
| 6,853,716 B1 * | 2/2005 | Shaffer et al. | 379/202.01 |
| 7,099,448 B1 * | 8/2006 | Laniepce et al. | 379/202.01 |
| 8,294,747 B1 * | 10/2012 | Weinberg et al. | 348/14.02 |
| 8,385,233 B2 | 2/2013 | Crinon et al. | 370/260 |
| 2006/0013416 A1 * | 1/2006 | Truong et al. | 381/119 |
| 2008/0088698 A1 * | 4/2008 | Patel et al. | 348/14.09 |
| 2008/0255840 A1 * | 10/2008 | Cutler | 704/246 |
| 2008/0312923 A1 * | 12/2008 | Crinon et al. | 704/246 |
| 2009/0220065 A1 * | 9/2009 | Ahuja et al. | 379/202.01 |
| 2010/0225737 A1 * | 9/2010 | King et al. | 348/14.09 |
| 2012/0218373 A1 * | 8/2012 | N'guessan | 348/14.08 |
| 2013/0106977 A1 * | 5/2013 | Chu et al. | 348/14.02 |
| 2014/0073300 A1 * | 3/2014 | Leeder et al. | 455/416 |

* cited by examiner

*Primary Examiner* — Hemant Patel
(74) *Attorney, Agent, or Firm* — Baker Botts L.L.P.

(57) ABSTRACT

In one embodiment, a method includes receiving requests to join a conference from a plurality of user devices proximate a first endpoint. The requests include a username. The method also includes receiving an audio signal for the conference from the first endpoint. The first endpoint is operable to capture audio proximate the first endpoint. The method also includes transmitting the audio signal to a second endpoint, remote from the first endpoint. The method also includes identifying, by a processor, an active speaker proximate the first endpoint based on information received from the plurality of user devices.

21 Claims, 5 Drawing Sheets

ACTIVE SPEAKER INDICATOR FOR CONFERENCE PARTICIPANTS

TECHNICAL FIELD

This disclosure relates generally to the field of communications and, more specifically, to an active speaker indicator for conference participants.

BACKGROUND

For some conferences or meetings, all the attendees or participants may not be in the same location. For example, some of the participants may be in one conference room, while other participants may be in another conference room and/or at various separate remote locations. A participant may wish to hear what the other participants in other locations are saying. The participant may also wish to know the identity of the participant who is currently speaking.

BRIEF DESCRIPTION OF THE DRAWINGS

For a more complete understanding of the present disclosure, reference is now made to the following description, taken in conjunction with the accompanying drawings, in which.

DETAILED DESCRIPTION

Overview

In one embodiment, a method includes receiving requests to join a conference from a plurality of user devices proximate a first endpoint. The requests include a username. The method also includes receiving an audio signal for the conference from the first endpoint. The first endpoint is operable to capture audio proximate the first endpoint. The method also includes transmitting the audio signal to a second endpoint, remote from the first endpoint. The method also includes identifying, by a processor, an active speaker proximate the first endpoint based on information received from the plurality of user devices.

In another embodiment, a system includes a processor. The system also includes a non-transitory computer-readable storage medium embodying software. The software is operable when executed by the processor to receive registration audio signals associated with a plurality of users. The software is also operable to generate voice identification information for the plurality of users based on the received registration audio signals. The software is also operable to store the voice identification information in a database. The software is also operable to receive an audio signal for a conference from a first endpoint. The first endpoint is operable to capture audio proximate the first endpoint. The software is also operable to transmit the audio signal to a second endpoint, remote from the first endpoint. The software is also operable to identify an active speaker proximate the first endpoint based on the audio signal and the voice identification information.

DESCRIPTION

Figure 1:
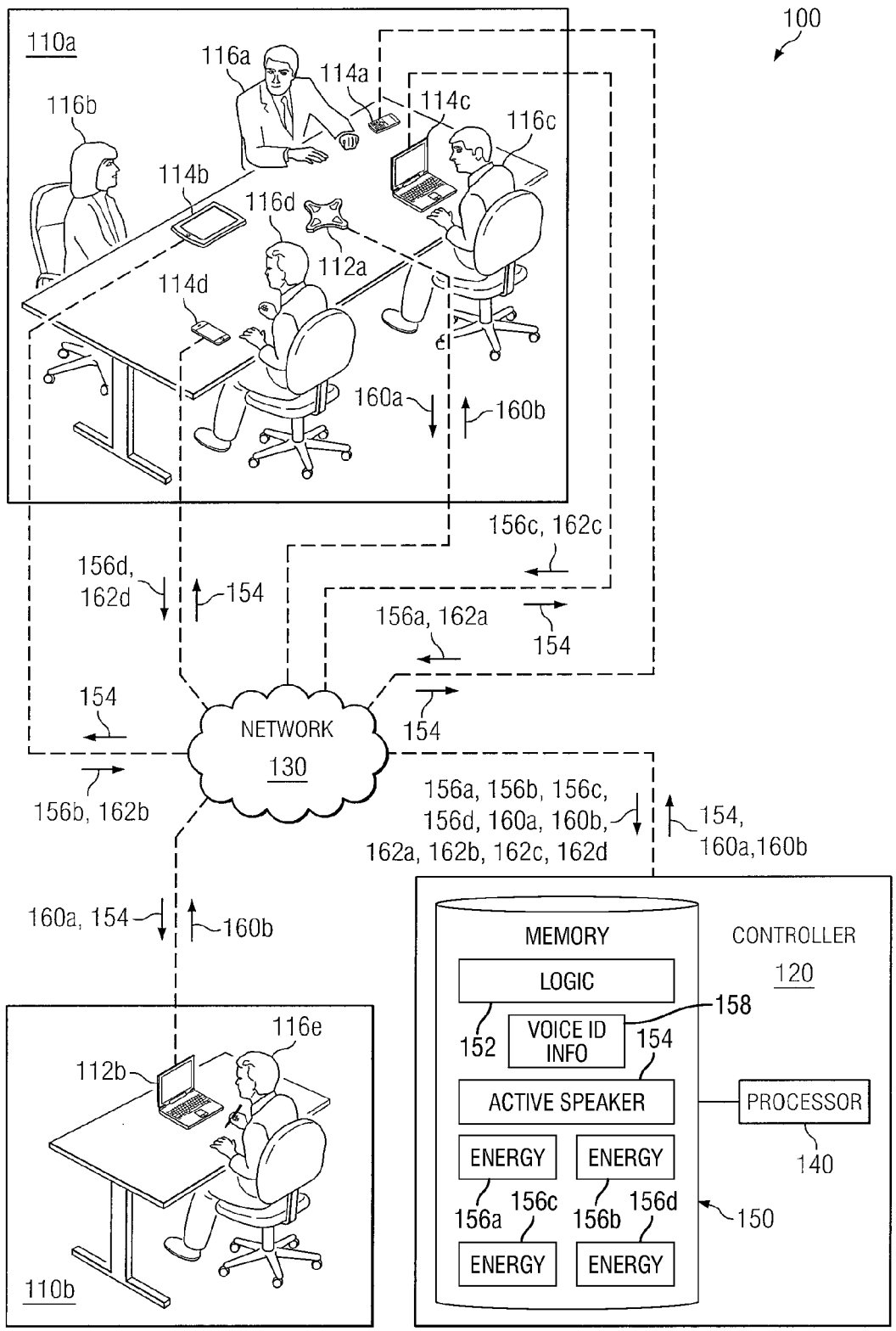
FIG. 1 illustrates an example conferencing system, in accordance with certain embodiments of the present disclosure.

FIG. 1 illustrates an example conferencing system 100, in accordance with certain embodiments of the present disclosure. In general, conferencing system 100 may allow numerous users 116, some or all of whom may be in different or remote locations, to participate in a conference. A conference may represent any meeting, conversation, or discussion between users 116. For example, conferencing system 100 may allow each user 116 to hear what remote users 116 are saying. Conferencing system 100 may also identify the active speaker at any given time (i.e. the user 116 who is currently speaking), even if multiple participants are at the same location. In particular, conferencing system 100 may include one or more conference locations 110, one or more endpoints 112, one or more user devices 114, one or more users 116, and a controller 120. Endpoints 112, user devices 114, and controller 120 may be communicatively coupled by a network 130.

Conference locations 110 may be any location from which one or more users 116 participate in a conference. In the example of FIG. 1, users 116a-d are located in a first conference location 110a, while user 116e is located in a second conference location 110b, which is remote from the first conference location 110a. In certain other embodiments, multiple users 116 may be located in the second conference location 110b. In further embodiments, additional users 116 may be located at a third conference location 110. Conferencing system 100 may include any suitable number of conference locations 110, and any suitable number of users 116 may be located at each conference location 110. Conference location 110 may include a conference room, an office, a home, or any other suitable location.

Each conference location 110 may include an endpoint 112. Endpoint 112 may refer to any device that connects a conference location 110 to a conference. Endpoint 112 may be operable to capture audio and/or video from conference location 110 (e.g. using one or more microphones and/or cameras) and transmit the audio and/or video signal 160 to endpoints 112 at other conference locations 110 (e.g. through controller 120). Endpoint 112 may also be operable to play audio and/or video signals 160 received from other endpoints 112. In some embodiments, endpoint 112 may include a speakerphone, conference phone, telephone, computer, workstation, Internet browser, electronic notebook, Personal Digital Assistant (PDA), cellular or mobile phone, pager, or any other suitable device (wireless, wireline, or otherwise), component, or element capable of receiving, processing, storing, and/or communicating information with other components of conferencing system 100. Endpoint 112 may also comprise any suitable user interface such as a display, microphone, speaker, keyboard, or any other appropriate terminal equipment usable by a user 116. Conferencing system 100 may comprise any suitable number and combination of endpoints 112.

User devices 114 may refer to any device that enables a user 116 to interact with controller 120. In some embodiments, a user device 114 may include a computer, workstation, telephone, Internet browser, electronic notebook, laptop computer, Personal Digital Assistant (PDA), cellular or mobile phone, pager, or any other suitable device (wireless, wireline, or otherwise), component, or element capable of receiving, processing, storing, and/or communicating information with other components of conferencing system 100. User device 114 may also comprise any suitable user interface such as a display, microphone, keyboard, camera, or any other appropriate equipment usable by a user 116. Conferencing system 100 may comprise any number and combination of user devices 114. In some embodiments, each user 116 may have a corresponding user device 114 situated near the user 116. In other embodiments, only some users 116 may have a user device 114.

In certain embodiments, network 130 may refer to any interconnecting system capable of transmitting audio, video, signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, controller 120 may refer to any suitable combination of hardware and/or software implemented in one or more modules to process data and provide the described functions and operations. In some embodiments, controller 120 and/or logic 152 may include a communication solution such as WebEx, available from Cisco Systems, Inc. In some embodiments, the functions and operations described herein may be performed by multiple controllers 120. In some embodiments, controller 120 may include, for example, a mainframe, server, host computer, workstation, web server, file server, a personal computer such as a laptop, or any other suitable device operable to process data. In some embodiments, controller 120 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. In some embodiments, controller 120 may be a web server running Microsoft's Internet Information Server™.

In general, controller 120 communicates with endpoints 112 and user devices 114 to facilitate a conference between users 116. In some embodiments, controller 120 may include a processor 140 and memory 150. Memory 150 may refer to any suitable device capable of storing and facilitating retrieval of data and/or instructions. Examples of memory 150 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or any other volatile or non-volatile computer-readable memory devices that store one or more files, lists, tables, or other arrangements of information. Although FIG. 1 illustrates memory 150 as internal to controller 120, it should be understood that memory 150 may be internal or external to controller 120, depending on particular implementations. Also, memory 150 may be separate from or integral to other memory devices to achieve any suitable arrangement of memory devices for use in conferencing system 100.

Memory 150 is generally operable to store logic 152, active speaker 154, audio energy values 156, and voice identification information 158. Logic 152 generally refers to logic, rules, algorithms, code, tables, and/or other suitable instructions for performing the described functions and operations.

Active speaker 154 may be any suitable data that identifies one or more users 114 that are speaking at a given time. Active speaker 154 may include a name, a username, an IP address, a MAC address, and/or any other suitable identifying information. Active speaker 154 may be determined by logic 152. Audio energy values 156 may be any suitable data received from user devices 114 regarding audio captured by user devices 114. Voice identification information 158 may be any suitable data regarding the characteristics of the voices of users 116. In some embodiments, voice identification information 158 may be stored in a database, which may also include additional information about users 116. In general, audio energy values 146 may allow controller 120 to identify one or more users 114 that are speaking at a given time. In addition or alternatively, voice identification information 158 may allow controller 120 to identify one or more users 114 that are speaking at a given time.

Memory 150 is communicatively coupled to processor 140. Processor 140 is generally operable to execute logic 152 stored in memory 150 to facilitate a conference between users 116 according to the disclosure. Processor 140 may include one or more microprocessors, controllers, or any other suitable computing devices or resources. Processor 140 may work, either alone or with components of conferencing system 100, to provide a portion or all of the functionality of conferencing system 100 described herein. In some embodiments, processor 140 may include, for example, any type of central processing unit (CPU).

In operation, logic 152, when executed by processor 140, facilitates a conference between users 116. Logic 152 may receive audio and/or video signals 160 from endpoints 112. In the example of FIG. 1, logic 152 receives audio signal 160a from endpoint 112a and audio signal 160b from endpoint 112b. Audio signal 160 may represent audio captured by the endpoint 112, such as the voices of the users 116 proximate the endpoint 112. Logic 152 may route audio and/or video signals 160 between the endpoints 112. In the example of FIG. 1, logic 152 transmits audio signal 160a to endpoint 112b and transmits audio signal 160b to endpoint 112a. In other embodiments, logic 152 may facilitate a connection between endpoints 112 so that endpoints 112 may communicate directly to exchange audio and/or video signals 160.

Logic 152 may also receive join requests 162 from user devices 114. Join requests 162 may represent requests to join a conference. In the example of FIG. 1, logic 152 receives join requests 162a-d from user devices 114a-d, respectively. In some embodiments, join requests 162 may include a username. The username may represent and/or be selected by the user 116 who is operating the particular user device 114 submitting the join request 162. In certain embodiments, logic 152 may determine the location of user device 114 relative to the endpoints 112. For example, logic 152 may determine that user device 114a is proximate endpoint 112a. This determination may be made using any suitable method, including asking user 116 to identify his or her location.

Logic 152 may be operable to identify an active speaker 154 at any given time. Logic 152 may perform this function in at least two ways. First, logic 152 may identify an active speaker 154 using audio energy values 156. Second, logic 152 may identify an active speaker 154 using voice identification information 158. In some embodiments, both ways may be used, either simultaneously or separately, to identify an active speaker 154. This may, for example, increase the accuracy of the identification of the active speaker 154.

Using Audio Energy Values

Logic 152 may receive information from user devices 114 that allows logic 152 to identify an active speaker 154 at any given time. For example, logic 152 may receive audio energy values 156 from user devices 114. Logic 152 may compare the audio energy values 156 in order to identify the active speaker 154 at any given time. For instance, logic 152 may identify the greatest received audio energy value 156. Logic 152 may then identify the greatest audio energy value user device 114 (i.e. the user device 114 that transmitted the identified greatest audio energy value 156). Logic 152 may then identify the user 116 operating the identified user device 114 as the current active speaker 154 (i.e. based on the username submitted by device 114 in the join request 162). Logic 152 may transmit the determined active speaker 154 to the endpoints 112 and/or the user devices 114. This process may be repeated throughout the conference to identify the active speaker 154 at any given time. Thus, a user 116 (such as user 116e) may be able to hear what is being said by users 116 at a remote location (such as users 116a-d) and to learn the identity of the user 116 speaking at any given time, even if multiple remote users 116 are at the same location 110 (such as users 116a-d at location 110a).

The audio energy values 156 may represent and/or be derived from audio captured by the respective transmitting user devices 114. Audio energy values 156 may represent any suitable measure of the strength of the captured audio. In certain embodiments, audio energy values 156 may be a time series signal representing the captured audio. Logic 152 may compare the received audio energy values 156 without performing additional pre-processing. Alternatively, logic 152 may perform processing operations on the received audio energy values 156 before comparing them. For example, logic 152 may calculate an average value of each audio energy value 156 over a particular time period, and may compare these calculated average values to identify the active speaker 154. In other embodiments, user devices 114 may perform processing operations on the captured audio to generate audio energy values 156. For example, audio energy values 156 may represent an average value of the captured audio over a particular time period. In some embodiments, the time period may be chosen based on characteristic patterns of human speech, such as typical durations of words and/or syllables, as well as typical lengths of silence between words and/or syllables.

In certain embodiments, logic 152 may not need to receive and/or compare audio energy values 156 from all the user devices 114. For example, logic 152 may be able to identify the conference location 110 where the current active speaker is located based on the audio signals 160 received from endpoints 112. Logic 152 may then need to receive and/or compare audio energy values 156 only from user devices 114 at the identified conference location 110 (e.g. proximate the corresponding endpoint 112).

In certain embodiments, logic 152 may calibrate user devices 114. Calibration may reduce differences in audio energy values 156 that are attributable to differences in the characteristics and/or configuration of the user devices 114, rather than the user devices' relative proximity to the user 116 who is currently speaking. Such calibration may facilitate more accurate comparison of energy values 156 and, thus, identification of active speaker 154. Calibration can be performed at user devices 114 and/or at controller 120. For example, logic 152 may control a user device 114 to adjust its recording volume for capturing audio based on known characteristics of the particular user device 114. As another example, logic 152 may adjust the audio energy value 156 received from a user device 114 based on known characteristics of the particular user device 114. The calibration may be performed using any suitable calibration technique.

In certain embodiments, logic 152 may identify multiple active speakers 154 at any given time. The number of active speakers to be identified at any given time may be configurable, or may be based on the audio energy values 156 received at any given time. For example, if the two greatest received audio energy values 156 at a particular time are relatively close in magnitude, and/or relatively far from the third greatest received audio energy value 156, two active speakers 154 may be identified during that time period based on the two greatest audio energy values 156. Logic 162 may be operable to identify any suitable number of active speakers 154 at any given time.

Using Voice Identification Information

Logic 152 may maintain voice identification information 158 that allows logic 152 to identify an active speaker 154 at any given time. Voice identification information 158 may be any suitable data regarding the characteristics of the voices of users 116. Logic 152 may identify an active speaker 154 based on the audio signals 160 and the voice identification information 158. For example, logic 152 may compare characteristics of the voices present in audio signals 160 to characteristics of the voices of users 116 (represented in the voice identification information 158) in order to determine which of the users 116 is the current active speaker 154. In certain embodiments, logic 152 may analyze audio signals 160 to extract certain voice features. Voice identification information 158 may store voice features for a variety of users 116. Logic 152 may select the user 116 whose voice features most closely match the extract voice features from audio signals 160 as the current active speaker 154 at any given time.

Logic 152 may transmit the determined active speaker 154 to the endpoints 112 and/or the user devices 114. This process may be repeated throughout the conference to identify the active speaker 154 at any given time. Thus, a user 116 (such as user 116e) may be able to hear what is being said by users 116 at a remote location (such as users 116a-d) and to learn the identity of the user 116 speaking at any given time, even if multiple remote users 116 are at the same location 110 (such as users 116a-d at location 110a).

In some embodiments, voice identification information 158 may be generated during a registration process. For example, each user 116 who wishes to use conferencing system 100 may register with conferencing system 100 in advance of participating in a conference. During the registration process, user 116 may provide a registration audio signal, which may contain a recording of user 116's speaking voice. In some embodiments, the registration audio signal may be audio captured by a user device 114 and transmitted to logic 152. For instance, logic 152 and/or user device 114 may present a passage of text to user 116 and record user 116 reading the text. Logic 152 may then analyze the registration audio signal in order to recognize speech patterns and/or voice features of user 116. The results of the analysis and/or the registration audio signal itself may be stored as voice identification information 158 for that user 116. This process can be repeated to generate voice identification information 158 for any suitable number of users 116.

In some embodiments, voice identification information 158 may be stored in a database, which may also include additional information about users 116. For example, during the registration process, personal information about a user 116 may be collected and stored in the database, such as a name, e-mail address, username, and/or any other suitable information. In addition, a photograph of a user 116 may be received (e.g. using a camera on user device 114) and stored in the database. As another example, the location of a user 116 may be collected and stored in the database. The location may represent a city, state, or other geographic area where the user 116 lives and/or works. The location may also represent a particular address or building where the user 116 lives and/or works.

In certain embodiments, logic 152 may not need to compare the audio signals 160 to voice identification information 158 for every user 116. Logic 152 may be able to limit its analysis to voice identification information 158 for a subset of the users 116 whose voice identification information 158 is stored in the database. Doing so may increase the accuracy of the identification and conserve computational resources and/or network bandwidth.

For example, logic 152 may select a subset of users 116 based on location information associated with the users 116 in the database. Logic 152 may be able to identify the conference location 110 where the current active speaker is located based on the audio signals 160 received from endpoints 112. Logic 152 may identify those users 116 who are most likely to be at the identified conference location 110 based on, for example, the place where each user 116 lives and/or works. For example, if conference location 110 is in California, but the database indicates that a particular user 116 is in Wisconsin, logic 152 may not need to consider the voice identification information 158 for that particular user 116.

As another example, logic 152 may select a subset of users 116 based on requests to join the conference that have been received. As discussed above, logic 152 may also receive join requests 162 from user devices 114, which may include a username. Logic 152 may be able to match the username or other suitable information provided in the join request to information stored in the database. As another example, if user device 114 is equipped with a camera, logic 152 may compare an image received from the camera to photographs of users 116 stored in the database to determine the identity of the user 116 associated with user device 114. Logic 152 may then limit analysis of voice identification information 158 to the subset of users 116 who have joined the conference.

In certain embodiments, logic 152 may be operable to update the voice identification information 158 based on feedback regarding the accuracy of the identification of active speaker 154. For example, user devices 114 and/or endpoints 112 may allow users 116 to indicate whether the active speaker 154 has been correctly identified. If not, users 116 may be able to provide the identity of the correct active speaker 154. Logic 152 may use this active speaker detection feedback to refine voice identification information 158.

For example, if the active speaker was correctly identified, logic 152 may update the voice identification information 158 for the user 116 identified as the active speaker to reinforce the correct detection. In certain embodiments, the voice features extracted from audio signals 160 may be used to update voice identification information 158 for that user 116. If the active speaker was incorrectly identified, logic 152 may update the voice identification information 158 for the user 116 who was incorrectly identified and/or the user 116 who should have been identified in order to reduce the likelihood of such a mistake recurring. In certain embodiments, the voice features extracted from audio signals 160 may be used to update voice identification information 158 for either or both of those users 116.

In certain embodiments, logic 152 may add active speaker identification information to video signals 160. For example, logic 152 may receive video signal 160a from endpoint 112a and determine the active speaker 154 to be user 116a Logic 152 may then process video signal 160a to produce a processed video signal 160a that includes information about user 116a. For example, the processed video signal 160a may display personal information about user 116a, such as user 116a's name, title, location, or any other suitable information. Logic 152 may then route the processed video signal 160a to endpoint 112b.

Figure 2A:
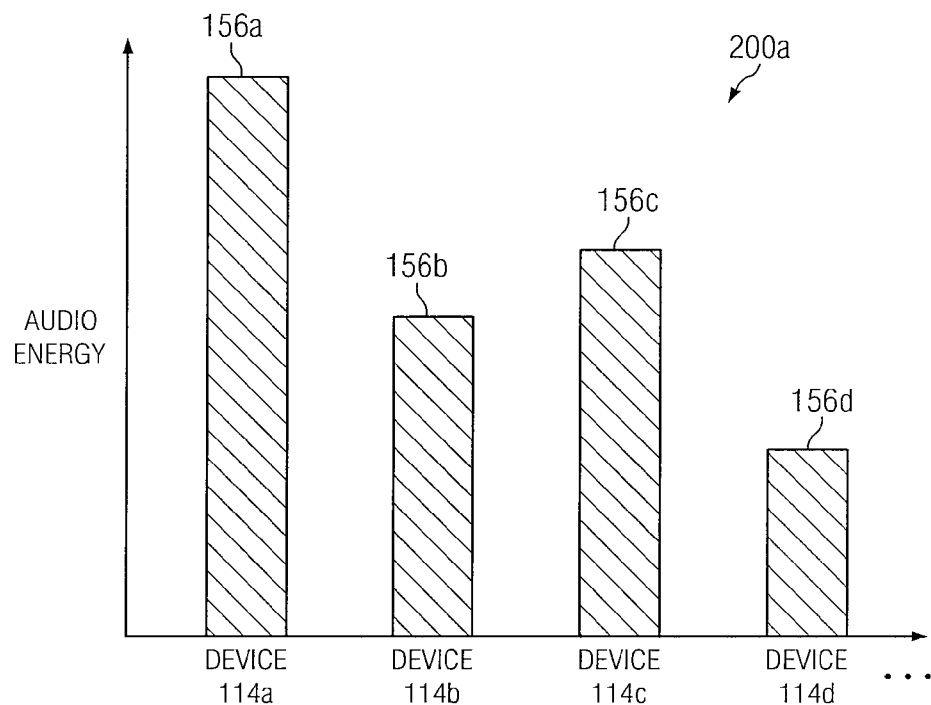
FIGS. 2A-2C illustrate example graphs comparing example audio energy values, in accordance with certain embodiments of the present disclosure.
Figure 2B:
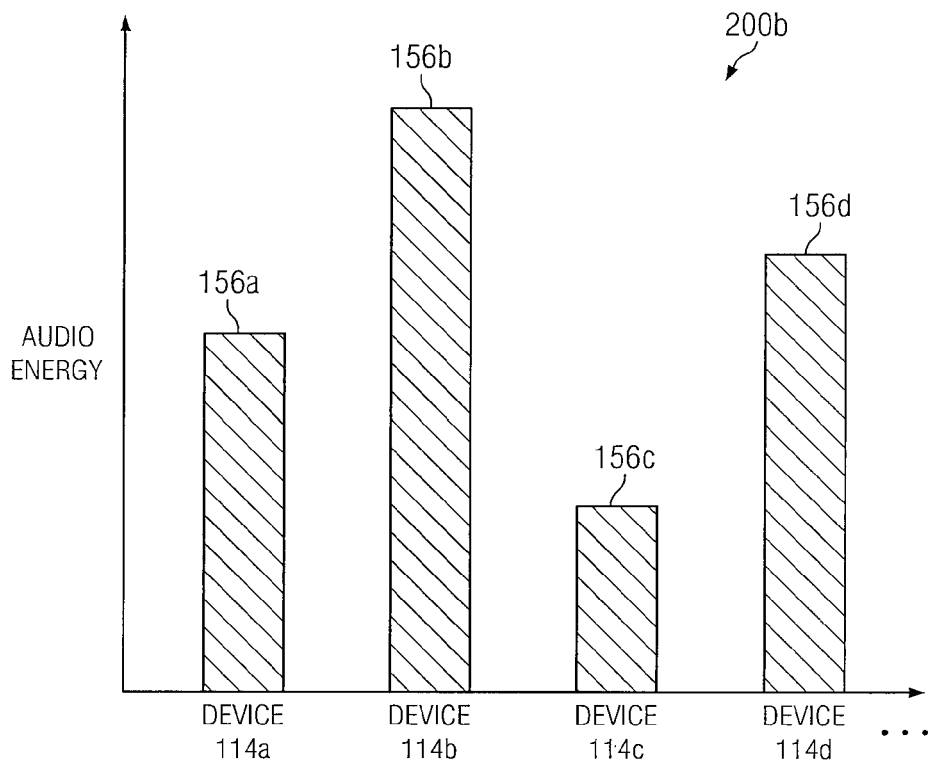
Figure 2C:
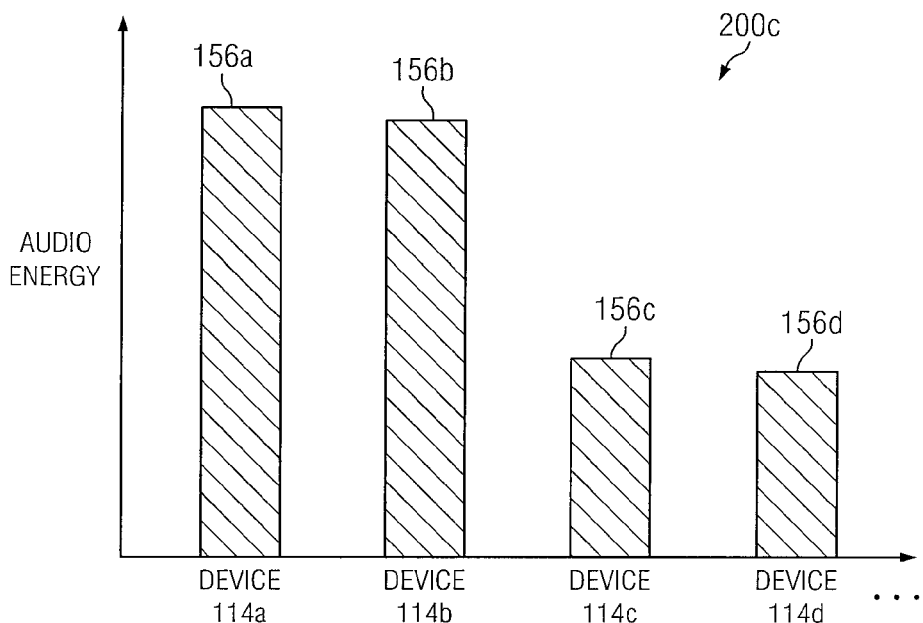

FIGS. 2A-2C illustrate example graphs 200a-c comparing example audio energy values 154, in accordance with certain embodiments of the present disclosure. Each graph 200 depicts the relative magnitudes of audio energy values 156a-d received from user devices 114a-d, respectively. FIG. 2A may represent audio energy values 156 during a time period when a user proximate user device 114a (e.g. user 116a) is speaking. Accordingly, audio energy value 156a, received from user device 114a, is greater than audio energy values 156b-d. Therefore, controller 120 may identify user device 114a as the greatest audio energy value user device and user 114a as active speaker 154. Although audio energy value 156a should be the greatest when user 116a is speaking, audio energy values 156b-d will not necessarily be zero. User devices 114b-d may still capture the sound of user 116a speaking. Because they are located further from user 116a relative to user device 114a, however, audio energy values 156b-d should still be less than audio energy value 156a.

FIG. 2B may represent audio energy values 156 during a time period when a user proximate user device 114b (e.g. user 116b) is speaking. Accordingly, audio energy value 156b, received from user device 114b, is greater than audio energy values 156a, 156c, and 156d. Therefore, controller 120 may identify user device 114b as the greatest audio energy value user device and user 114b as active speaker 154. Although audio energy value 156b should be the greatest when user 116b is speaking, audio energy values 156a, 156c, and 156d will not necessarily be zero. User devices 114a, 114c, and 114d may still capture the sound of user 116b speaking. Because they are located further from user 116b relative to user device 114b, however, audio energy values 156a, 156c, and 156d should still be less than audio energy value 156b.

FIG. 2C may represent audio energy values 156 during a time period when two users 114 are speaking simultaneously (e.g. users 116a and 116b). Alternatively, FIG. 2C may represent audio energy values 156 during a time period when user 116a is speaking, but user devices 114a and 114b are almost equidistant from user 116a, such that they capture user 116a's speech with almost equal strength, resulting in very similar audio energy values 156. In certain embodiments, controller 120 may determine that two active speakers should be identified in one or both of these scenarios. Therefore, controller 120 may identify user devices 114a-b as the greatest audio energy value user devices. For example, after identifying the greatest audio energy value 156, controller 120 may set a threshold value below the greatest audio energy value 156 and determine whether any other audio energy values 156 are greater than the threshold value. The threshold value may be set based on the greatest audio energy value 156, as well as the other received audio energy values, or in any other suitable manner.

Figure 3:
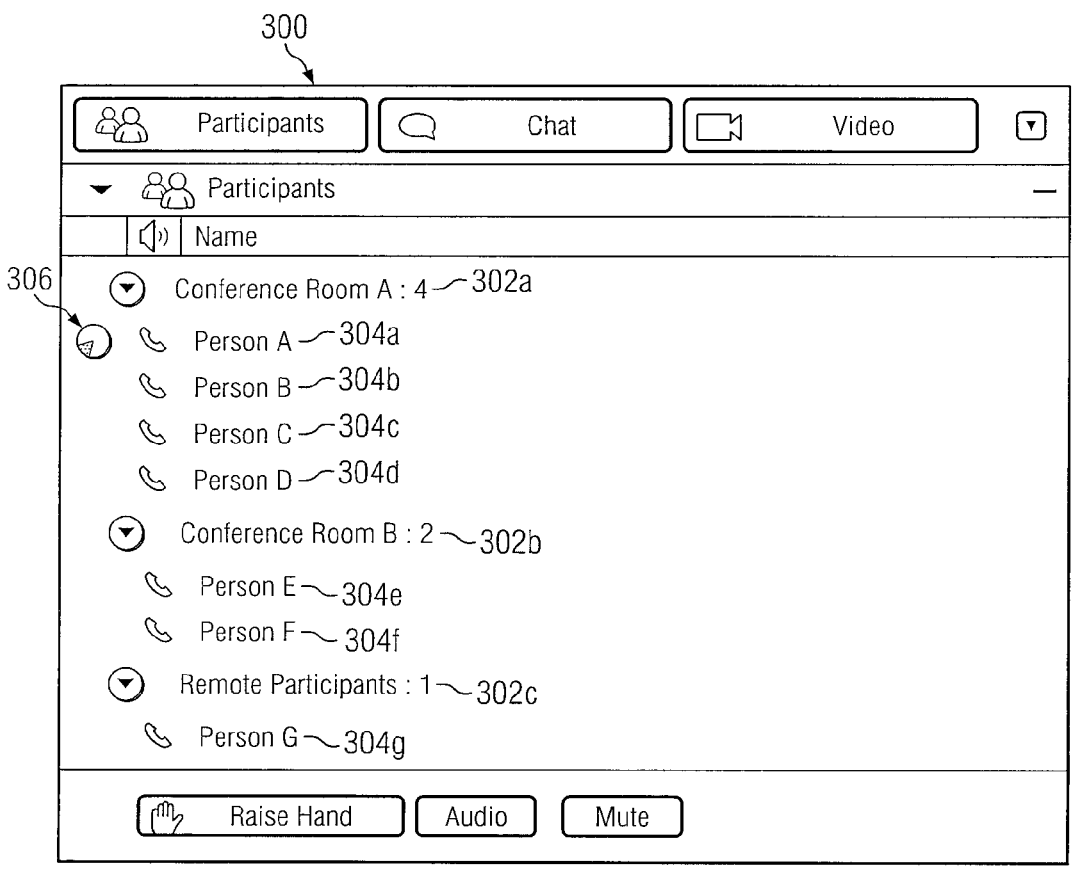
FIG. 3 illustrates an example screenshot of a conference information window that may be generated by the conferencing system of FIG. 1, in accordance with certain embodiments of the present disclosure.

FIG. 3 illustrates an example screenshot of a conference information window 300 that may be generated by the system of FIG. 1, in accordance with certain embodiments of the present disclosure. Conference information window 300 may be one embodiment of a graphical user interface (GUI) which may be displayed on endpoints 112 and/or user devices 114 of conferencing system 100. The GUI may be generally operable to tailor and filter data presented to users 116. The GUI may provide users 116 with an efficient and user-friendly presentation of active speaker 154, as well as other information pertaining to the conference and/or conferencing system 100. The GUI may additionally provide users 116 with an efficient and user-friendly way of inputting and submitting join requests 162. The GUI may comprise a plurality of displays having interactive fields, pull-down lists, and buttons operated by user 116. The GUI may include multiple levels of abstraction including groupings and boundaries. It should be understood that the term GUI may be used in the singular or in the plural to describe one or more graphical user interfaces and each of the displays of a particular graphical user interface.

Conference information window 300 may provide information about the conference participants, such as endpoints 112 and user devices 114 that are connected to the conference. Fields 302a-c indicate conference locations, as well as the number of usernames associated with each location. Fields 304a-g indicate usernames submitted as users 116 join the conference. The usernames are grouped by the location of the corresponding user 116. For example, field 302a corresponds to "Conference Room A," which may represent a first endpoint 112 (such as endpoint 112a from FIG. 1). Fields 304a-d correspond to "Person A," "Person B," "Person C," and "Person D," usernames received from four user devices 114 proximate to the first endpoint 112 (such as user devices 114a-d from FIG. 1).

Similarly, field 302b corresponds to "Conference Room B," which may represent a second endpoint 112. Fields 304e-f correspond to "Person E" and "Person F," usernames received from two user devices 114 proximate to the second endpoint 112.

Field 302c may correspond to a location assigned to users 116 who are not in a conference room, and/or who are not sharing an endpoint 112 with any other users 116, such as "Remote Participants." For example, field 302c may correspond to "Person G," a username received from a third endpoint 112 (such as endpoint 112b from FIG. 1). Alternatively, field 304g may correspond to a username received from a user device 114 not proximate any endpoint 112.

Active speaker indicator 306 may be used to communicate the identity of active speaker 154 to users 116. In the example of FIG. 3, active speaker indicator 306 may indicate that "Person A" is the current active speaker 154. In certain embodiments, conference information window 300 may include multiple active speaker indicators 306 to communicate the identity of multiple active speakers 154 to users 116, according to particular needs.

Figure 4:
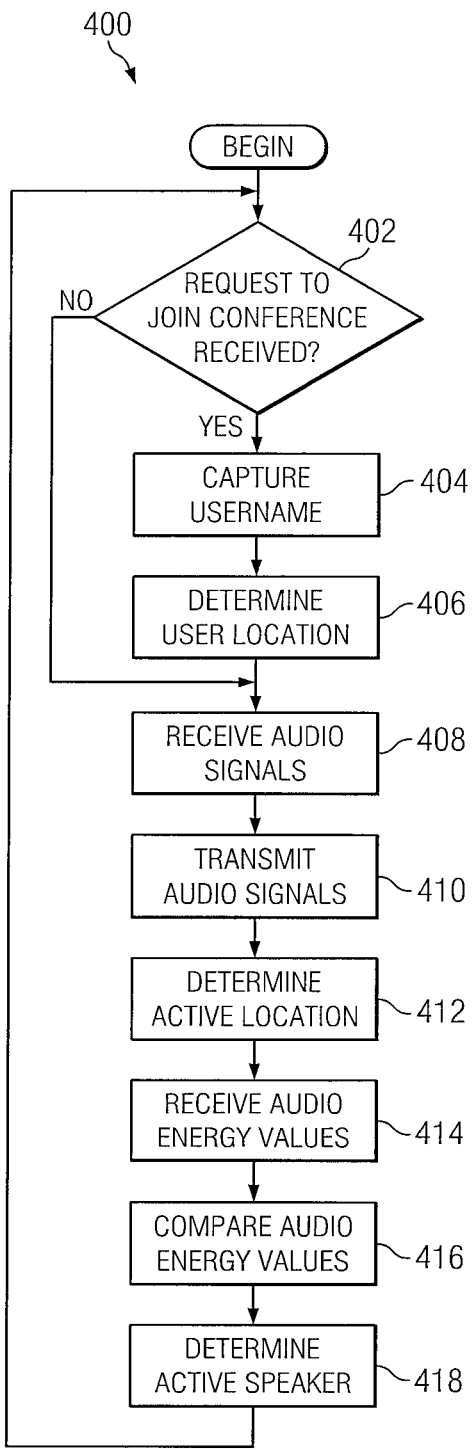
FIG. 4 illustrates an example conferencing method, in accordance with certain embodiments of the present disclosure.

FIG. 4 illustrates an example conferencing method 400, in accordance with certain embodiments of the present disclosure. At step 402, controller 120 determines whether a request to join the conference has been received. Controller 120 may receive join requests 162 from one or more user devices 114. If no request is received, the method proceeds to step 408. If a request is received, the method proceeds to step 404, where the username is captured. A join request 162 may include a username. The username may represent and/or be selected by the user 116 who is operating the particular user device 114 submitting the join request 162. At step 406, controller 120 determines the location of the joining user device 114 relative to the endpoints 112. This determination may be made using any suitable method, including asking user 116 to identify his or her location.

At step 408, controller 120 may receive audio signals 160 from endpoints 112. Audio signal 160 may represent audio captured by the endpoint 112, such as the voices of the users 116 proximate the endpoint 112. At step 410, controller 120 may route audio signals 160 between the endpoints 112. For example, controller 120 may transmit the audio signal 160 received from a first endpoint to a second endpoint, and may transmit the audio signal 160 received from the second endpoint to the first endpoint.

At step 412, controller 120 may determine the active conference location. The active conference location may represent the conference location 110 at which the current active speaker is located. For example, controller 120 may be able to determine the conference location 110 where the current active speaker is located based on the audio signals 160 received from endpoints 112.

At step 414, controller 120 may receive audio energy values 156 from user devices 114 located at the active conference location. The audio energy values 156 may represent and/or be derived from audio captured by the respective transmitting user devices 114. Audio energy values 156 may represent any suitable measure of the strength of the captured audio. In some embodiments, controller 120 may also calibrate user devices 114. For example, controller 120 may control a user device 114 to adjust its recording volume for capturing audio based on known characteristics of the particular user device 114. As another example, controller 120 may adjust the audio energy value 156 received from a user device 114 based on known characteristics of the particular user device 114.

At step 416, controller 120 compares the received audio energy values 156. For example, controller 120 may compare a first audio energy value 156 received from a first user device 114 with a second audio energy value 156 received from a second user device 114. As another example, controller 120 may identify the greatest received audio energy value 156.

At step 418, controller 120 determines the active speaker 154. Controller 120 may identify the greatest audio energy value user device 114 (i.e. the user device 114 that transmitted the identified greatest audio energy value 156). Controller 120 may then identify the user 116 operating the identified user device 114 as the current active speaker 154 (i.e. based on the username submitted by device 114 in the join request 162). Controller 120 may transmit the determined active speaker 154 to the endpoints 112 and/or the user devices 114. In certain embodiments, controller 120 may identify multiple active speakers during a single time period. The number of active speakers to be identified at any given time may be configurable, or may be based on the audio energy values 156 received at any given time. For example, if the two greatest received audio energy values 156 at a particular time are relatively close in magnitude, and relatively far from the third greatest received audio energy value 156, two active speakers 154 may be identified during that time period based on the two greatest audio energy values 156. This disclosure contemplates that any suitable number of active speakers 154 may be identified at any given time, according to particular needs.

The method may then return to step 402 and may be repeated throughout the conference to route audio signals 160 between the endpoints 112 and to identify the active speaker 154 at any given time.

Figure 5:
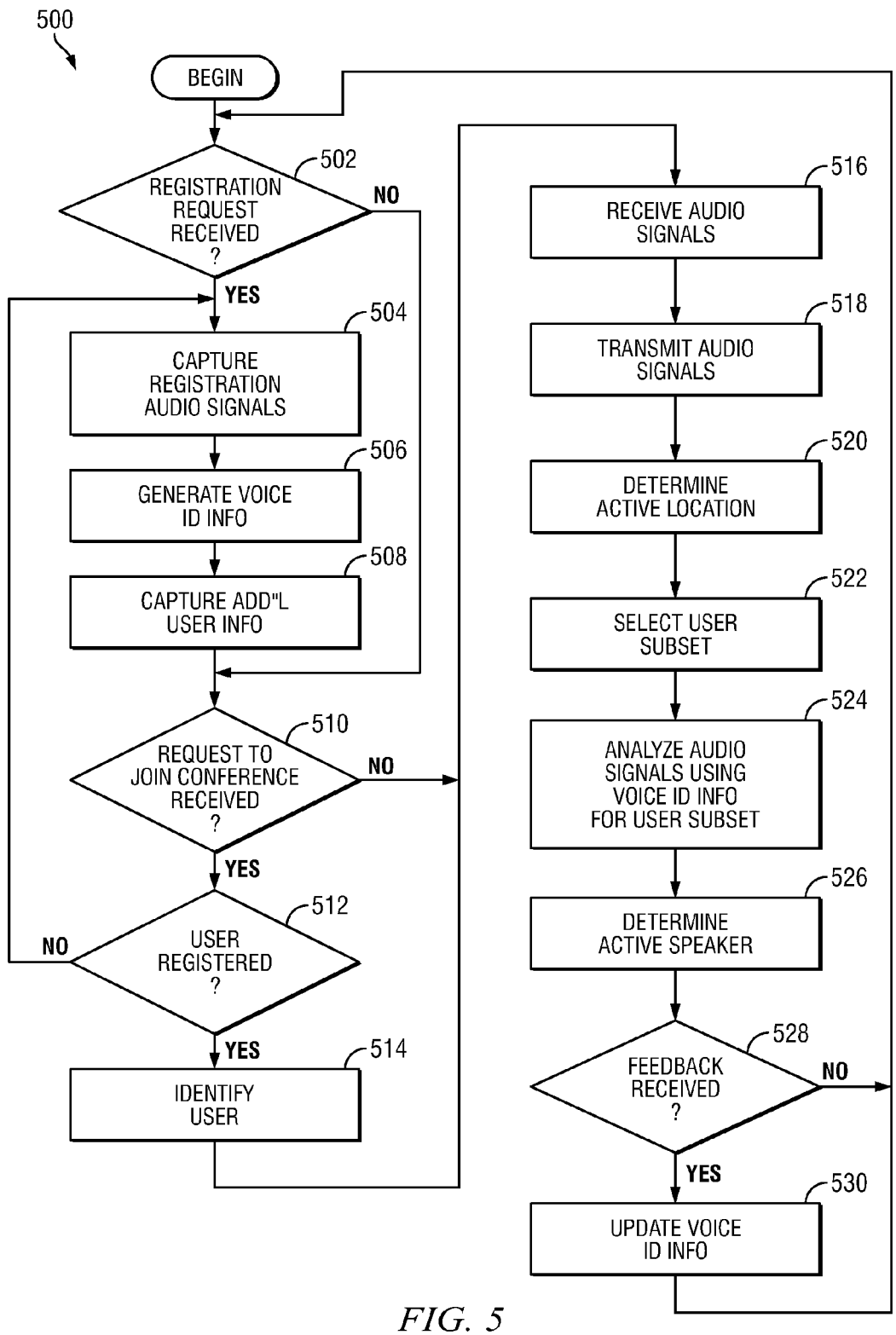
FIG. 5 illustrates another example conferencing method, in accordance with certain embodiments of the present disclosure.

FIG. 5 illustrates another example conferencing method 500, in accordance with certain embodiments of the present disclosure. At step 502, controller 120 determines whether a request to register with the conferencing system has been received. Controller 120 may receive registration requests from one or more user devices 114. If no request is received, the method proceeds to step 510. If a request is received, the method proceeds to step 504, where a registration audio signal is captured. The registration audio signal may contain a recording of the speaking voice of the user who is requesting registration. In some embodiments, the registration audio signal may be audio captured by a user device 114 and transmitted to controller 120. For instance, controller 120 and/or user device 114 may present a passage of text to the user and record the user reading the text. At step 506, voice identification information is generated for the user. Controller 120 may analyze the registration audio signal in order to recognize speech patterns and/or voice features of the user. The results of the analysis and/or the registration audio signal itself may be stored as voice identification information for the user.

At step 508, additional user information may be captured. For example, during the registration process, personal information about the user may be collected and stored in a database along with the generated voice identification information, such as a name, e-mail address, username, and/or any other suitable information. In addition, a photograph of the user may be received and stored in the database. As another example, the location of the user may be collected and stored in the database. The location may represent a city, state, or other geographic area where the user lives and/or works. The location may also represent a particular address or building where the user lives and/or works.

At step 510, controller 120 determines whether a request to join the conference has been received. Controller 120 may receive join requests 162 from one or more user devices 114. If no request is received, the method proceeds to step 516. If a request is received, the method proceeds to step 512, where controller 120 determines whether the user requesting to join the conference is registered with the conferencing system. If the user is not registered, the method returns to step 504, so that registration audio signals can be captured for the new user. If the user is registered, the method proceeds to step 514, where the user requesting to join the conference is identified. For example, the join request 162 may include personal information about the user, such as a name, e-mail address, username, and/or any other suitable information. In certain embodiments, the join request 162 may also include a photograph or image or the user requesting to join. Controller 120 may be able to match this information against user data in the database which stores the voice identification information. In some embodiments, controller 120 may determine the location of the joining user relative to the endpoints 112. This determination may be made using any suitable method, including asking the user to identify his or her location.

At step 516, controller 120 may receive audio signals 160 from endpoints 112. Audio signal 160 may represent audio captured by the endpoint 112, such as the voices of the users 116 proximate the endpoint 112. At step 518, controller 120 may route audio signals 160 between the endpoints 112. For example, controller 120 may transmit the audio signal 160 received from a first endpoint to a second endpoint, and may transmit the audio signal 160 received from the second endpoint to the first endpoint.

At step 520, controller 120 may determine the active conference location. The active conference location may represent the conference location 110 at which the current active speaker is located. For example, controller 120 may be able to determine the conference location 110 where the current active speaker is located based on the audio signals 160 received from endpoints 112.

At step 522, controller 120 may select a subset of the users whose voice identification information is stored in the database. The selected subset may reduce the amount of information controller 120 needs to retrieve and/or analyze from the database. As described in connection with FIG. 1, the subset may be selected based on the join requests that have been received, based on location information stored in the database, and/or on any other suitable basis, according to particular needs.

At step 524, controller 120 may analyze audio signals 160 using voice identification information for the selected subset of users. For example, controller 120 may compare characteristics of the voices present in audio signals 160 to characteristics of the voices of the users in the subset (represented in the voice identification information) in order to determine which of those users is the current active speaker 154. In certain embodiments, controller 120 may analyze audio signals 160 to extract certain voice features and compare those to voice features stored in voice identification information for the subset of users. Logic 152 may select the user 116 whose voice features most closely match the extract voice features from audio signals 160 as the current active speaker 154 at any given time.

At step 526, controller 120 determines the active speaker 154. Controller 120 may identify the user most likely to be speaking based on the voice identification information. For example, controller 120 may select the user 116 whose voice features most closely match the extract voice features from audio signals 160 as the current active speaker 154 at any given time. Controller 120 may transmit the determined active speaker 154 to the endpoints 112 and/or the user devices 114.

At step 528, controller 120 may determine if active speaker detection feedback has been received. Active speaker detection feedback may be any feedback regarding the accuracy of the identification of active speaker 154. For example, user devices 114 and/or endpoints 112 may allow users 116 to indicate whether the active speaker 154 has been correctly identified and/or to provide the identity of the correct active speaker. If such feedback is received, the method proceeds to step 530. If not, the method may then return to step 502 and may be repeated throughout the conference to route audio signals 160 between the endpoints 112 and to identify the active speaker 154 at any given time.

At step 530, controller 120 may update voice identification information based on the received active speaker detection feedback. Controller 120 may use the active speaker detection feedback to refine voice identification information in order to improve the accuracy of future detections, as described above in connection with FIG. 1. The method may then return to step 502 and may be repeated throughout the conference to route audio signals 160 between the endpoints 112 and to identify the active speaker 154 at any given time.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system, comprising:
a processor; and
a non-transitory computer-readable storage medium embodying software that is operable when executed by the processor to:
receive requests to join a conference from a plurality of user devices proximate a first endpoint, the requests comprising a username;
receive an audio signal for the conference from the first endpoint, the first endpoint operable to capture audio proximate the first endpoint;
transmit the audio signal to a second endpoint, remote from the first endpoint;
receive a plurality of audio energy values from the plurality of user devices proximate the first endpoint, the audio energy values associated with the audio signal;
identify an active speaker proximate the first endpoint based on the audio energy values received from the plurality of user devices; and
transmit an identity of the identified active speaker to the second endpoint while continuing to transmit audio signals received from the first endpoint to the second endpoint wherein: the active speaker is a first active speaker; identify a second active speaker proximate the first endpoint based on the audio energy values received from the plurality of user devices; and transmit an identity for both the first active speaker and the second active speaker to the second endpoint.

2. The system of claim 1, wherein:
the software is further operable when executed to identify the active speaker proximate the first endpoint by comparing the plurality of audio energy values.

3. The system of claim 2, wherein the software is further operable when executed to identify the active speaker proximate the first endpoint by calibrating the plurality of user devices.

4. The system of claim 2, wherein the software is further operable when executed to identify the active speaker proximate the first endpoint by:
identifying a greatest audio energy value user device of the plurality of user devices; and
identifying the username transmitted by the greatest audio energy value user device as the active speaker.

5. The system of claim 1, wherein the software is further operable when executed to identify the active speaker proximate the first endpoint by:
receiving a first audio energy value from a first user device of the plurality of user devices;
receiving a second audio energy value from a second user device of the plurality of user devices; and
comparing the first audio energy value with the second audio energy value.

6. A method, comprising:
receiving requests to join a conference from a plurality of user devices proximate a first endpoint, the requests comprising a username;
receiving an audio signal for the conference from the first endpoint, the first endpoint operable to capture audio proximate the first endpoint;
transmitting the audio signal to a second endpoint, remote from the first endpoint;
receiving a plurality of audio energy values from the plurality of user devices, the audio energy values associated with the audio signal;
identifying, by a processor, an active speaker proximate the first endpoint based on the audio energy values received from the plurality of user devices; and
transmit an identity of the identified active speaker to the second endpoint while continuing to transmit audio signals received from the first endpoint to the second endpoint wherein: the active speaker is a first active speaker; identifying a second active speaker proximate the first endpoint based on the audio energy values received from the plurality of user devices; and transmitting an identity for both the first active speaker and the second active speaker to the second endpoint.

7. The method of claim 6, wherein:
identifying the active speaker proximate the first endpoint based on the audio energy values received from the plurality of user devices comprises comparing the plurality of audio energy values.

8. The method of claim 7, wherein identifying the active speaker proximate the first endpoint based on information received from the plurality of user devices further comprises calibrating the plurality of user devices.

9. The method of claim 7, wherein identifying the active speaker proximate the first endpoint based on information received from the plurality of user devices further comprises:
identifying a greatest audio energy value user device of the plurality of user devices; and
identifying the username transmitted by the greatest audio energy value user device as the active speaker.

10. The method of claim 6, wherein identifying the active speaker proximate the first endpoint based on the audio energy values received from the plurality of user devices comprises:
receiving a first audio energy value from a first user device of the plurality of user devices;
receiving a second audio energy value from a second user device of the plurality of user devices; and
comparing the first audio energy value with the second audio energy value.

11. One or more non-transitory computer-readable storage media embodying software that is operable when executed by a processor to:
receive requests to join a conference from a plurality of user devices proximate a first endpoint, the requests comprising a username;
receive an audio signal for the conference from the first endpoint, the first endpoint operable to capture audio proximate the first endpoint;
transmit the audio signal to a second endpoint, remote from the first endpoint;
receive a plurality of audio energy values from the plurality of user devices, the audio energy values associated with the audio signal;
identify an active speaker proximate the first endpoint based on the audio energy values received from the plurality of user devices; and
transmit an identity of the identified active speaker to the second endpoint while continuing to transmit audio signals received from the first endpoint to the second endpoint wherein: the active speaker is a first active speaker; identify a second active speaker proximate the first endpoint based on the audio energy values received from the plurality of user devices; and transmit an identity for both the first active speaker and the second active speaker to the second endpoint.

12. The media of claim 11, wherein:
the software is further operable when executed to identify the active speaker proximate the first endpoint by comparing the plurality of audio energy values.

13. The media of claim 12, wherein the software is further operable when executed to identify the active speaker proximate the first endpoint by calibrating the plurality of user devices.

14. The media of claim 12, wherein the software is further operable when executed to identify the active speaker proximate the first endpoint by:
identifying a greatest audio energy value user device of the plurality of user devices; and
identifying the username transmitted by the greatest audio energy value user device as the active speaker.

15. The media of claim 11, wherein the software is further operable when executed to identify the active speaker proximate the first endpoint by:
receiving a first audio energy value from a first user device of the plurality of user devices;
receiving a second audio energy value from a second user device of the plurality of user devices; and
comparing the first audio energy value with the second audio energy value.

16. A system, comprising:
a processor; and
a non-transitory computer-readable storage medium embodying software that is operable when executed by the processor to:
receive requests to join a conference from a plurality of user devices proximate a first endpoint, the requests comprising a username;
receive registration audio signals associated with a plurality of users;
generate voice identification information for the plurality of users based on the received registration audio signals;
store the voice identification information in a database;
receive an audio signal for the conference from the first endpoint, the first endpoint operable to capture audio proximate the first endpoint;
transmit the audio signal to a second endpoint, remote from the first endpoint;
identify an active speaker proximate the first endpoint based on the audio signal and the voice identification information; and
transmit an identity of the identified active speaker to the second endpoint while continuing to transmit audio signals received from the first endpoint to the second endpoint wherein: the active speaker is a first active speaker; identify a second active speaker proximate the first endpoint based on the audio signals received from the first endpoint; and transmit an identity for both the first active speaker and the second active speaker to the second endpoint.

17. The system of claim 16, wherein the software is further operable when executed to:
select a subset of the plurality of users; and
identify the active speaker proximate the first endpoint based on the audio signal and the voice identification information for the subset of the plurality of users.

18. The system of claim 17, wherein the software is further operable when executed to:
select the subset of the plurality of users based on the received requests to join the conference.

19. The system of claim 17, wherein:
the database further stores location information associated with the plurality of users; and
the software is further operable when executed to:
determine a location of the first endpoint; and
select the subset of the plurality of users based on the location information associated with the plurality of users.

20. The system of claim 16, wherein the software is further operable when executed to:
receive active speaker detection feedback, the feedback indicating the accuracy of the active speaker identification; and
update the voice identification information based on the active speaker detection feedback.

21. The system of claim 16, wherein the software is further operable when executed to:
receive a video signal for the conference from the first endpoint;
process the video signal to produce a processed video signal that includes active speaker identification information; and
transmit the processed video signal to the second endpoint.

* * * * *